United States Patent
Pescod et al.

(10) Patent No.: US 8,055,136 B2
(45) Date of Patent: Nov. 8, 2011

(54) DATA COMMUNICATIONS SYSTEM

(75) Inventors: Christopher Ralph Pescod, Chelmford (GB); Mohammed Nawaz, Chelmsford (GB); Clive William Miller, Chelmsford (GB)

(73) Assignee: BAE Systems PLC, London (GB)

( * ) Notice: Subject to any disclaimer, the term of this patent is extended or adjusted under 35 U.S.C. 154(b) by 881 days.

(21) Appl. No.: 11/665,261

(22) PCT Filed: Oct. 27, 2005

(86) PCT No.: PCT/GB2005/004152
§ 371 (c)(1),
(2), (4) Date: Apr. 12, 2007

(87) PCT Pub. No.: WO2006/051262
PCT Pub. Date: May 18, 2006

(65) Prior Publication Data
US 2009/0047023 A1    Feb. 19, 2009

(30) Foreign Application Priority Data

Nov. 15, 2004    (EP) .................................... 04257067
Nov. 15, 2004    (GB) .................................. 0425156.7

(51) Int. Cl.
*H04B 10/00*      (2006.01)
(52) U.S. Cl. ........................ 398/115; 398/70; 398/116
(58) Field of Classification Search ............ 398/79, 398/82, 91, 95, 115, 116, 186, 201, 70
See application file for complete search history.

(56) References Cited

U.S. PATENT DOCUMENTS 5,936,754 A * 8/1999 Ariyavisitakul et al. ....... 398/28
6,671,079 B2 12/2003 Fuller et al.
(Continued)

FOREIGN PATENT DOCUMENTS

| EP | 0 391 597 A3 | 10/1990 |
| EP | 1 173 034 A1 | 1/2002 |
| EP | 1 339 179 A2 | 8/2003 |
| EP | 1 443 687 A1 | 8/2004 |

(Continued)

OTHER PUBLICATIONS

Massel, "Digital Television: DVB-T COFDM and ATSC 8—VsB", Second Edition, 1990 (online) http://digitaltvbooks.com, 8 pages.

(Continued)

*Primary Examiner* — Dzung Tran
(74) *Attorney, Agent, or Firm* — Buchanan Ingersoll & Rooney PC

(57) ABSTRACT

A base station is provided for communicating data to a mobile terminal unit by means of at least one antenna unit, wherein the at least one antenna unit is linked to the base station by means of at least one optical fiber and the at least one antenna unit is operable to communicate wirelessly with the mobile terminal unit. The base station comprises an optical transmitter for transmitting modulated data signals to the at least one antenna unit for wireless transmission, an optical receiver for receiving modulated data signals forwarded by the at least one antenna unit and a demodulator for demodulating received modulated data signals. The optical transmitter comprises a first optical modulator arranged to modulate an optical carrier with a radio frequency oscillator signal to generate an optical oscillator signal, a second optical modulator, coupled optically to the first optical modulator, operable to modulate the optical oscillator signal with an input data signal of a predetermined frequency to generate a downlink optical data signal and an optical output for directing the downlink optical data signal to the at least one antenna unit by means of the at least one optical fiber.

20 Claims, 11 Drawing Sheets

U.S. PATENT DOCUMENTS

| | | | |
|---|---|---|---|
| 6,674,969 B1* | 1/2004 | Ogusu | 398/79 |
| 2002/0012495 A1* | 1/2002 | Sasai et al. | 385/24 |
| 2002/0030870 A1* | 3/2002 | Aburakawa et al. | 359/145 |
| 2002/0114047 A1 | 8/2002 | McBrien et al. | |
| 2003/0231601 A1* | 12/2003 | Kim | 370/277 |
| 2004/0008395 A1 | 1/2004 | McBrien et al. | |
| 2004/0179852 A1* | 9/2004 | Westbrook et al. | 398/183 |

FOREIGN PATENT DOCUMENTS

| | | |
|---|---|---|
| GB | 2 335 814 A | 9/1999 |
| GB | 2 370 170 A | 6/2002 |

OTHER PUBLICATIONS

Sen Lin Zhang et al. "Assessment of the Nonlinearity Tolerance of Different Modulation Schemes for Millimeter-wave Fiber-Radio Systems Using MZ Modulators" IEEE Transactions of Microwave Theory and Techniques, IEEE Service Center, Piscataway, NJ, US, vol. 45 No. 8, Part 2, Aug. 1997, pp. 1403-1409, XP000696769 ISSN: 0018-9480 p. 1, col. 1, paragraph 1-p. 3, col. 1, paragraph 1 p. 5, col. 1, paragraph 2—col. 2, Figure 2.

Braun R-P et al: "Low-Phase-Noise Millimeter-Wave Generation at 64 GHZ and Data Transmission Using Optical Sideband Injection Locking" IEEE Photonics Technology Letter, IEEE vol. 10, No. 5, May 1998, pp. 728-730, XP000754669 ISSN: 1041-1135 the whole document.

European Search Report.

International Search Report.

\* cited by examiner

DATA COMMUNICATIONS SYSTEM

TECHNICAL FIELD

The present invention relates to data communications and in particular to a method and apparatus for communicating data between terminal devices, at least one of which is a mobile terminal device.

SUMMARY

According to a first aspect of the present invention, there is provided a base station, operable to communicate data over a two-way communications channel established with a mobile terminal unit, by way of at least one antenna unit operable to communicate wirelessly with the mobile terminal unit, wherein the base station is operable to communicate with said at least one antenna unit over an optical fibre link, the base station comprising:

an optical transmitter for generating and transmitting downlink optical data signals to said at least one antenna unit; and an optical receiver for receiving uplink optical data signals generated by said at least one antenna unit in respect of said communications channel, wherein said optical transmitter comprises:

a light source operable to generate an optical carrier;

a first optical modulator operable to modulate said optical carrier with a radio frequency oscillator signal to generate an optical oscillator signal suitable for use by said at least one antenna unit in generating uplink optical data signals; and a second optical modulator, coupled optically to the first optical modulator, operable to generate and to output a downlink optical data signal comprising the optical oscillator signal modulated with an input data signal of a frequency allocated in respect of said communications channel.

In a preferred embodiment of the present invention both the first and second optical modulators are Mach-Zehnder optical modulators. Preferably the first Mach-Zehnder optical modulator is biased at the minimum of its transfer characteristic so that the optical oscillator signal includes an oscillator signal having twice the frequency of the radio frequency oscillator signal used to modulate the optical carrier. Preferably, the second Mach-Zehnder optical modulator is biased at the quadrature point of its transfer characteristic.

According to a second aspect of the present invention there is provided a base station for communicating data over a two-way communications channel established with a mobile terminal unit, by way of at least one antenna unit, wherein said at least one antenna unit is linked to the base station by means of at least one optical fibre and said at least one antenna unit is operable to communicate wirelessly with the mobile terminal unit, the base station comprising:

an optical transmitter for generating and transmitting downlink optical data signals to said at least one antenna unit;

an optical receiver for receiving uplink optical data signals generated by said at least one antenna unit; and a demodulator for demodulating received uplink optical data signals in respect of said communications channel, wherein said optical transmitter comprises:

a first modulator arranged to modulate a radio frequency oscillator signal with an input modulated data signal of a frequency allocated in respect of said communications channel to generate a modulated output signal comprising an oscillator signal and a modulated data signal; and a second, optical, modulator arranged to modulate an optical carrier with the modulated signal output by the first modulator to generate and output a downlink optical signal comprising an optical oscillator signal, for use by said at least one antenna unit to generate uplink optical data signals, and a downlink optical data signal.

Preferably, the first modulator is a single sideband substantially non-suppressed carrier electrical modulator and the second, optical, modulator is a Mach-Zehnder optical modulator biased at the minimum of its transfer characteristic so that the downlink optical signal includes an optical oscillator signal having twice the frequency of the radio frequency oscillator signal modulated by said first modulator.

According to a third aspect of the present invention there is provided an antenna unit for use with a base station defined according to the first or second aspects of the present invention, comprising:

a photodetector for converting a received downlink optical data signal into a radio frequency signal; and means to separate said radio frequency signal into a data signal for wireless transmission by the antenna unit and a local oscillator signal for use within the antenna unit to generate uplink optical data signals.

According to a fourth aspect of the present invention there is provided a method of communicating data over a two-way communications channel established between a base station and a mobile terminal unit, by way of at least one antenna unit that is linked to said base station by means of an optical fibre link and is operable to communicate wirelessly with said mobile terminal unit, the method comprising the steps of:

(i) at a first optical modulator within said base station, modulating an optical carrier with the output from a radio frequency oscillator to generate an optical oscillator signal suitable for use by said at least one antenna unit to generate uplink optical data signals;

(ii) at a second optical modulator within said base station, linked optically to the first optical modulator, modulating the optical oscillator signal with an input modulated data signal of a frequency allocated in respect of said communications channel to generate a downlink optical data signal;

(iii) conveying the downlink optical data signal by means of said optical fibre link to said at least one antenna unit; and (iv) at said at least one antenna unit, converting the downlink optical data signal into a radio frequency data signal for wireless transmission and a local oscillator signal for use within the antenna unit to generate uplink optical data signals.

According to a fifth aspect of the present invention there is provided a mobile terminal unit for use in communicating with a base station as defined according to the first or second aspects of the present invention, the mobile terminal unit comprising:

a modulator operable to modulate an input data signal;

signal conversion means to convert the modulated input data signal into an uplink data signal having a frequency within a predetermined frequency range allocated in respect of a communications channel; and a transmitter operable to transmit wirelessly the uplink data signal for reception by at least one antenna unit linked to the base station.

Preferably, the signal conversion means comprise:

a local oscillator operable at a frequency corresponding to that of an oscillator signal output by the base station in a downlink optical data signal; and a mixer operable to mix an oscillator signal output by the local oscillator with the modulated data signal output by the modulator to generate the uplink data signal.

According to a sixth aspect of the present invention, there is provided a communications system, comprising a base station and at least one antenna unit linked to the base station by an optical fibre link, wherein the system is operable to communicate data over a two-way communications channel established with a mobile terminal unit, and wherein said at least one antenna unit is operable to communicate wirelessly with the mobile terminal unit, the base station comprising:

an optical transmitter for generating and transmitting downlink optical data signals to said at least one antenna unit; and an optical receiver for receiving uplink optical data signals generated by said at least one antenna unit in respect of said communications channel, wherein said optical transmitter comprises:

a light source operable to generate an optical carrier;

a first optical modulator operable to modulate said optical carrier with a radio frequency oscillator signal to generate an optical oscillator signal suitable for use by said at least one antenna unit in generating uplink optical data signals; and a second optical modulator, coupled optically to the first optical modulator, operable to generate and to output a downlink optical data signal comprising the optical oscillator signal modulated with an input data signal of a frequency allocated in respect of said communications channel.

The key advantages of transmitting a millimeter-wave local oscillator signal to remote antenna units are:

1) only a single LO source is required in the base station irrespective of the number of antenna units;

2) the uplink from each antenna unit to the base station may operate at a lower, intermediate frequency (1.5-3.5 GHz in preferred embodiments of the present invention), compared to the free-space uplink which operates, for example, in the 62-64 GHz range. This enables a lower-cost implementation of an uplink optical distribution network.

Throughout the present patent specification, where the words "comprise", "comprises" or "comprising", or variations thereupon, are used they are to be interpreted to mean that the subject in question includes the element or elements that follow, but that the subject is not limited to including only that element or those elements.

BRIEF DESCRIPTION OF THE DRAWINGS

Preferred embodiments of the present invention will now be described in more detail by way of example only and with reference to the accompanying drawings, of which.

DETAILED DESCRIPTION

Preferred embodiments of the present invention relate to an apparatus designed to provide a communications path between terminals, at least one of which is a mobile terminal unit. In a preferred application, one or more high bandwidth communications channels are to be provided to enable wireless communication between a central terminal and one or more mobile devices, for example high-definition television cameras moving within a relatively enclosed environment such as a large TV studio or film set. In such an environment, high-frequency signals, preferably of the order of 55-65 GHz, which when communicated wirelessly, are subject to attenuation, distortion and other effects. Such effects are not typically encountered, or not encountered to the same extent, in conventional mobile communications systems which operate with lower frequency signals and in more open environments. A preferred apparatus comprises a base station and one or more remote antenna units (RAUs). A preferred mobile terminal unit transmit/receive interface will also be described for use with the preferred base station and remote antenna units. An overview of the preferred apparatus and its operation will now be described with reference to FIG. 1.

Figure 1:
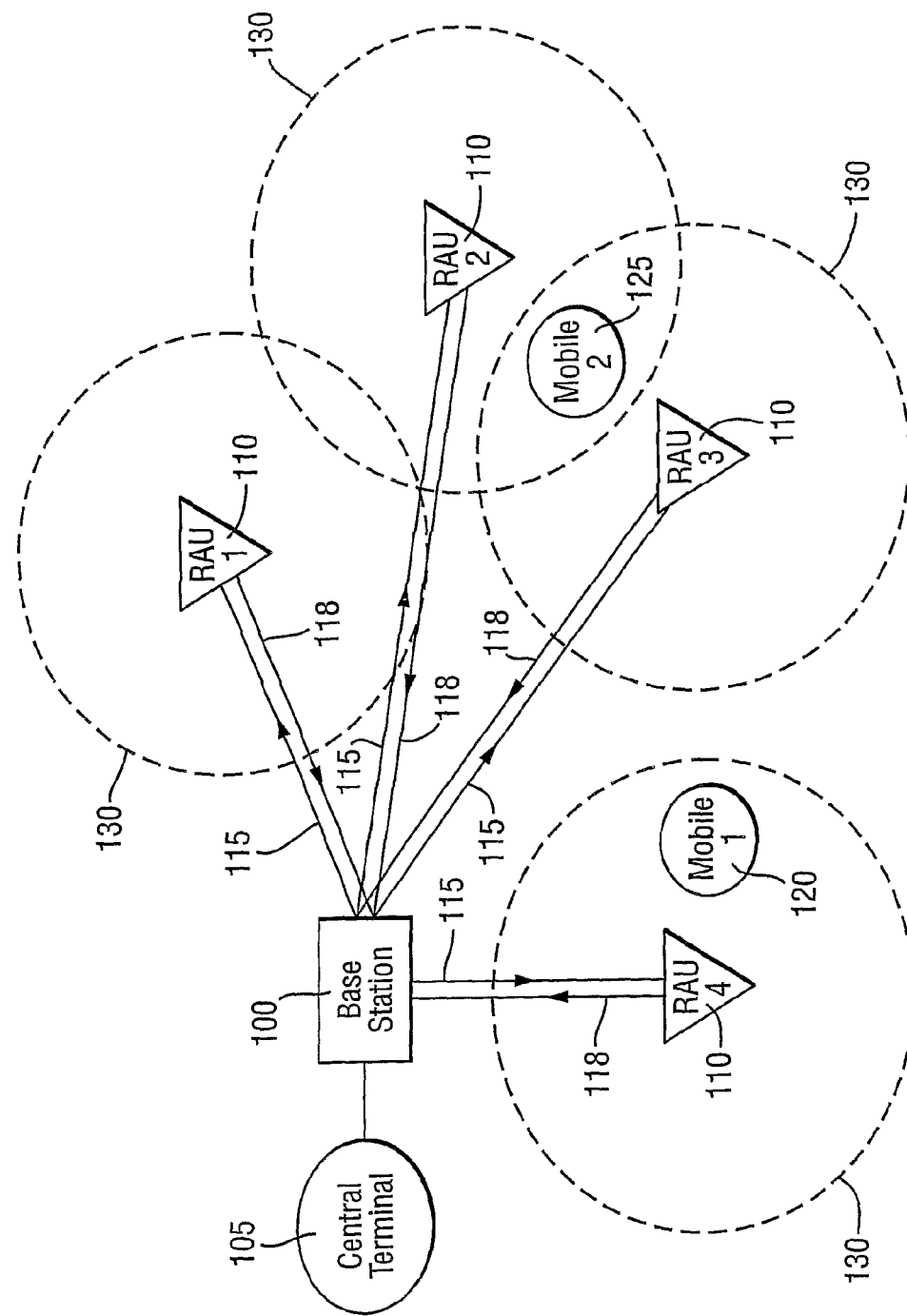
FIG. 1 shows in overview a fibre-radio communication apparatus according to preferred embodiments of the present invention.

Referring to FIG. 1, a base station 100 is arranged to communicate with one or more mobile data terminals 120, 125 by means of RAUs 110. Each RAU 110 is linked to the base station 100 by means of a downlink optical fibre 115 and an uplink optical fibre 118 in a fibre-radio architecture. Optical fibre transmission is used for communication between the base station 100 and RAUs 110, rather than an electrical transmission line (e.g. coaxial cable or electrical waveguide) or radio frequency (RF) transmission. This is particularly relevant at frequencies of the order of 60 GHz, where electrical waveguide insertion loss is ~1.5 dB/m and attenuation is approximately 12 dB/km in free space. The base station 100 is arranged to modulate data signals received for example from a central terminal unit 105 or other terminal device and to transmit them optically, with low loss, to each of the RAUs 110 over the downlink optical fibres 115. Each of the RAUs 110 is arranged to convert the received optical signals into millimeter-wave signals for wireless transmission from their antennae. A target mobile data terminal 120, 125 moving within the area of radio coverage 130 of one or more of the RAUs 110 is then able to receive the transmitted signal.

In the uplink direction, a radio-frequency signal transmitted by a mobile data terminal 120, 125 may be received by one or more RAUs 110. Each receiving RAU 110 is arranged to down-convert the received signal into an intermediate frequency (IF) data signal and to optically transmit the IF data signal over the respective uplink optical fibre 118 for reception by the base station 100. After demodulating the optically carried IF data signal the base station 100 outputs the resultant signal.

Whereas, in preferred embodiments of the present invention, separate downlink 115 and uplink 118 optical fibre transmission lines are specified for simplicity, it is possible to combine downlink and uplink transmission lines between the base station 100 and an RAU 110 in a single optical fibre through use of appropriate multiplexing and modulation techniques and interfaces to split and combine fibres at the base station 100.

A number of RAUs 110 with overlapping radio coverage areas 130 are arranged to form a single-frequency cellular structure using a different frequency for each of the mobile data terminals 120, 125. This is in contrast to conventional cellular radio systems in which a different frequency would be allocated for use by each RAU 110 to communicate with mobile data terminals 120, 125 moving within its area of radio coverage 130. Moreover, use of a single frequency per mobile in preferred embodiments of the present invention avoids the need for a control system that would otherwise be needed, as in a conventional cellular radio system, to manage the handover of mobile data terminals 120, 125 as they move from the radio coverage area 130 and hence the communication frequency of one RAU 110 to those of another. This helps to ensure continuous communication with no interruption (essential for the transmission of real-time high data rate digital video signals, for example), often not possible with conventional multiple frequency cellular radio systems where brief interruptions are often experienced as a mobile changes its frequency when it moves between cells.

Elements and operation of the base station 100 according to a preferred embodiment of the present invention will now be described in more detail with reference to FIG. 2, and further with reference to FIG. 1.

Figure 2:
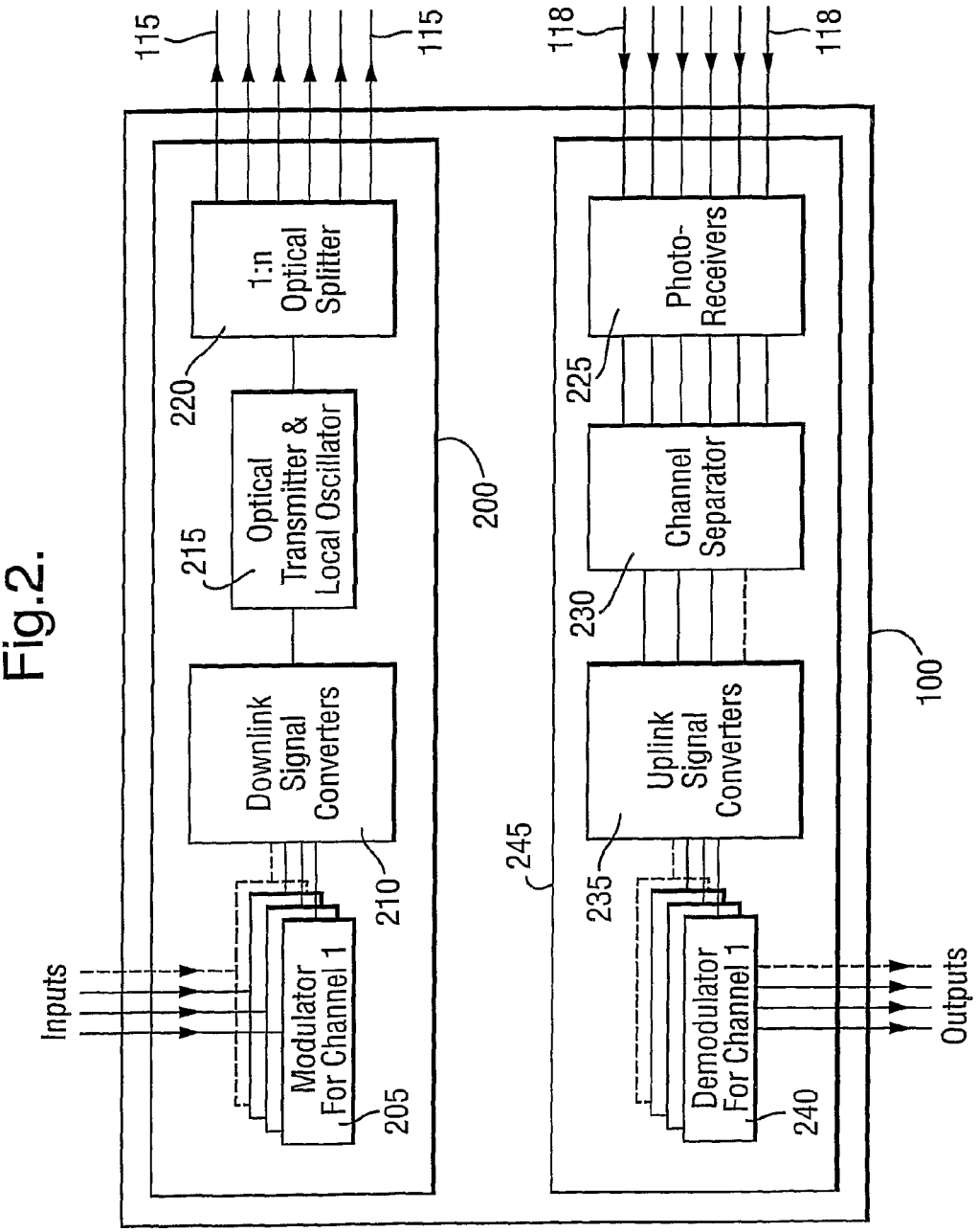
FIG. 2 shows principal elements of a base station for use in preferred embodiments of the present invention.

Referring to FIG. 2, the base station 100 is seen to comprise two main sections: a downlink transmitting interface 200 and an uplink receiving interface 245. Optical outputs from the downlink interface 200 and optical inputs to the uplink interface 245 are joined by means of an appropriate interface to the optical fibres 115 and 118 respectively linking each of the RAUs 110 to the base station 100. Data signals intended for a particular target mobile data terminal 120, 125 are received by the downlink transmitting interface 200 of the base station 100 where a number of modulators 205 are provided, each one dedicated to modulating input data signals in respect of a different data channel. A data channel may be used to communicate with one or more mobile terminal units 120, 125 according to the bandwidth requirements of those terminals. However, in a preferred embodiment of the present invention directed to a TV or film studio application, it is likely that a single mobile terminal unit 120, 125 would require the entire bandwidth of a data channel for its own use, at least in an uplink direction. The base station 100 would be equipped to provide as many data channels as required by the particular application. However, limitations in frequency availability would ultimately limit the number of channels that may be provided. In preferred embodiments of the present invention, use of the 55-65 GHz band provides sufficient bandwidth to handle a number of high data rate duplex channels.

After modulation by an appropriate modulator 205 the modulated input signal is input to a downlink signal converter 210 where modulated signals for the respective data channel are converted to a predetermined frequency allocated specifically for the channel. The converted signal is then input to an optical transmitter and local oscillator 215 arranged to generate a downlink optical signal, preferably comprising an optical oscillator signal that is modulated by the converted input signal for transmission to the RAUs 110. Preferably, the downlink optical signal output by the optical transmitter 215 includes a separate local oscillator signal that is then available for use, after isolation, by each receiving RAU 110, so avoiding the need to deploy an oscillator of the same frequency at each RAU 110. This reduces complex and bulky circuitry for generating and controlling a local oscillator signal within each RAU 110. This proves advantageous as the RAUs 110 are preferably designed to be small and compact so that they may be placed for example in environments, e.g. lamp posts in certain applications, where the temperature may vary significantly and may make an LO signal unstable. The downlink optical signal is input to an optical splitter 220 where it is divided and injected into each of the downlink optical fibre links 115 by means of an appropriate interface to be conveyed to each of the RAUs 110.

Where the number of RAUs 110 is such that use of a single optical splitter 220 is either impractical or results in excessively weak downlink optical signals being injected into each of the downlink fibres 115, considering the length of fibre 115 being used, an alternative technique for dividing the downlink optical signal may be implemented in which lower-order splitters, e.g. 1:4, are deployed in a cascaded arrangement, with erbium-doped fibre amplifiers being used to boost the signal if required. For example, an initial splitter 220 at the base station 100 may be linked to remote splitters located nearer to the particular RAUs 110 being served to further sub-divide the signals.

In the uplink direction, any signals received by one or more RAUs 110 from a mobile data terminal 120, 125 are converted and forwarded to the base station 100 over the uplink optical fibres 118 to arrive at the uplink receiving interface 245. The uplink receiving interface 245 includes a set of photo-receivers 225, one photo-receiver for each uplink optical fibre 118, which detects and converts uplink optical signals arriving over the uplink optical fibres 118 into IF signals for input to a channel separator 230. Uplink optical signals may comprise a combination of signals for one or more data channels which need to be separated by the base station 100. The channel separator 230 is therefore designed to separate the signals for each data channel (and hence for the different mobile data terminals 120, 125) on the basis that the signal for each data channel has a different predetermined frequency. Separated signals for each channel are then input to uplink signal converters 235 where the signals at their respective predetermined frequencies are converted for input to demodulators 240, a different demodulator 240 for each data channel. The demodulated output of each demodulator 235 forms the output from the base station 100, for example to the central terminal unit 105.

Operation of the RAUs 110 will now be described in a little more detail with reference to FIG. 3, and further with reference to FIG. 2.

Figure 3:
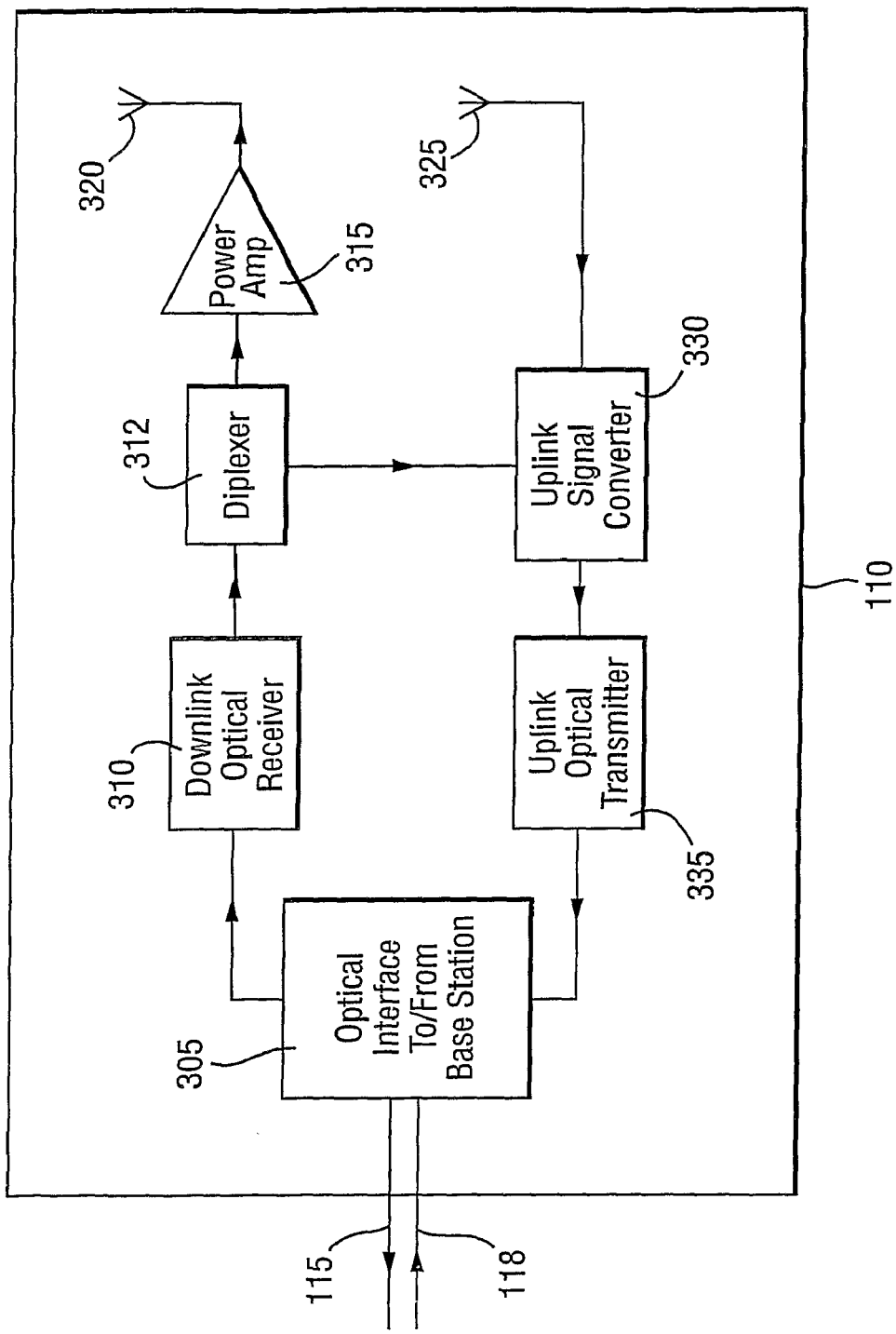
FIG. 3 shows principal elements of a remote antenna unit for use in preferred embodiments of the present invention.

Referring to FIG. 3, an RAU 110 is provided with a downlink optical receiver 310 and an uplink optical transmitter 335, each linked by means of an optical interface 305 to the downlink optical fibre 115 and uplink optical fibre 118 respectively that connect the RAU 110 to the base station 100. The downlink optical receiver 310 is arranged to receive downlink optical signals transmitted by the base station optical transmitter and local oscillator 215 and to convert the received optical signals into radio frequency (RF) signals. The RF signals are input to a diplexer 312 arranged to separate the local oscillator signal generated by the base station optical transmitter 215 from the data signals for one or more data channels. The data signals output by the diplexer 312 are amplified by an amplifier 315 and fed to an antenna 320 for wireless transmission by the RAU 110.

In the uplink direction, any RF signal transmitted by a mobile data terminal 120, 125 and received at an antenna 325 is passed to an uplink signal converter 330 arranged to convert the received RF signal into an intermediate frequency (IF) data signal. The uplink signal converter 330 uses the local oscillator signal separated by the diplexer 312 to convert the received RF signal into the IF data signal which in turn is passed to the uplink optical transmitter 335 to generate an uplink optical signal for transmission to the base station 100 over the uplink optical fibre 118. Preferably the uplink optical transmitter 335 transmits the IF data signal either by directly modulating a laser diode or by modulating the light from a (CW) laser diode in an external optical modulator. In particular applications it may be more convenient to use wavelength division multiplexing at the RAU 110 and wavelength division demultiplexing at the base station 100 so that multiple uplink optical signals may be combined onto a single uplink optical fibre 118 serving all the RAUs 110, or at least onto a reduced number of uplink optical fibres 118. However, in that case, the laser diode used in the uplink optical transmitter 335 would need to be selected so as to emit light of a wavelength compatible with the wavelength division multiplexer and with the associated channel spacing.

Whereas FIG. 3 shows a different antenna (320) being used at an RAU 110 for transmitting signals to that (325) used for receiving signals, the same physical antenna may be used for both transmitting and receiving.

As mentioned above, a different predetermined frequency is allocated to each data channel provided by the base station 100 and RAUs 110. The use of a different frequency per data channel provides one of the preferred elements in embodiments of the present invention that enables a single frequency (per mobile data terminal 120, 125) mobile communications network to be operated. Another preferred element enabling the single frequency network to operate is the choice of modulation technique implemented by the modulators 205 and demodulators 240 in the base station 100 and replicated in each of the mobile data terminals 120, 125.

In a single frequency communications arrangement based upon the architecture shown in FIG. 1 in which the areas of radio coverage 130 of the RAUs 110 may overlap, a transmitted signal may be received by a mobile data terminal 120, 125 from two or more different RAUs 110 delayed by slightly, different amounts due to their differing distances from the mobile data terminal 120, 125. For example, referring to FIG. 1, it can be seen that while the mobile terminal unit 120 lies within the radio coverage area 130 of a single RAU 110—"RAU 4"—the other mobile terminal unit 125 lies within a region of overlapping radio coverage for two RAUs 110—"RAU 2" and "RAU 3". Similarly, a signal transmitted by a mobile data terminal 120, 125 may be received by more than one RAU 110 located within range of the mobile terminal so that each received signal would be forwarded to arrive at the base station 100 at slightly different times. In each case, the modulation scheme chosen should be inherently tolerant of such signal delays so that received signals may be combined and successfully demodulated by the mobile data terminal 120, 125 in the downlink direction and, in the uplink direction, by the base station 100.

In preferred embodiments of the present invention, the modulation scheme selected is the Coded Orthogonal Frequency Division Multiplexing (COFDM) scheme as described, for example, in a book by Mark Massel, entitled "Digital Television: DVB-T COFDM and ATSC 8—VsB", published by Digitaltvbooks.Com, ISBN 0970493207. One of the key features of COFDM that enables modulated data signals to be received with differing delays, combined and successfully demodulated, is the use of so-called guard intervals in the modulated data signals.

COFDM is a form of multi-carrier digital modulation wherein data are modulated onto a large number of closely-spaced carriers whose separation in the frequency domain is carefully chosen so that each carrier is orthogonal to the other carriers, so eliminating interference between them when transmitted simultaneously. Each carrier is arranged to send one symbol at a time. The time taken to transmit a symbol is called the symbol duration. In order to ensure that there is no inter-symbol interference on a particular carrier due to the delayed arrival at a receiver of a first symbol from two or more different antennae, the symbol duration may be extended by the modulator by the insertion of a so-called guard interval of predetermined length between transmitted symbols on the particular carrier to ensure that the next symbol on the carrier arrives at the receiver after the last delayed arrival of the first symbol.

Preferably, each of the downlink optical fibres 115 and each of the uplink optical fibres 118 are of substantially equal length so as to minimise differential time delays in conveying signals between the base station 100 and each of the RAUs 110.

The downlink transmitting interface 200 of the base station 100 will now be described in more detail, according to a preferred embodiment of the present invention, with reference to FIG. 4. The same reference numerals are used to label features shown in FIG. 4 that are similar to those in any of the earlier figures. In this preferred embodiment, the base station 100 provides two communications channels. This two-channel example will be used as the basis for the remainder of the description in the present patent application in order to simplify the figures, although, of course, the base station 100 may be equipped to provide further data channels as required, as will become clear from the description that follows.

Figure 4:
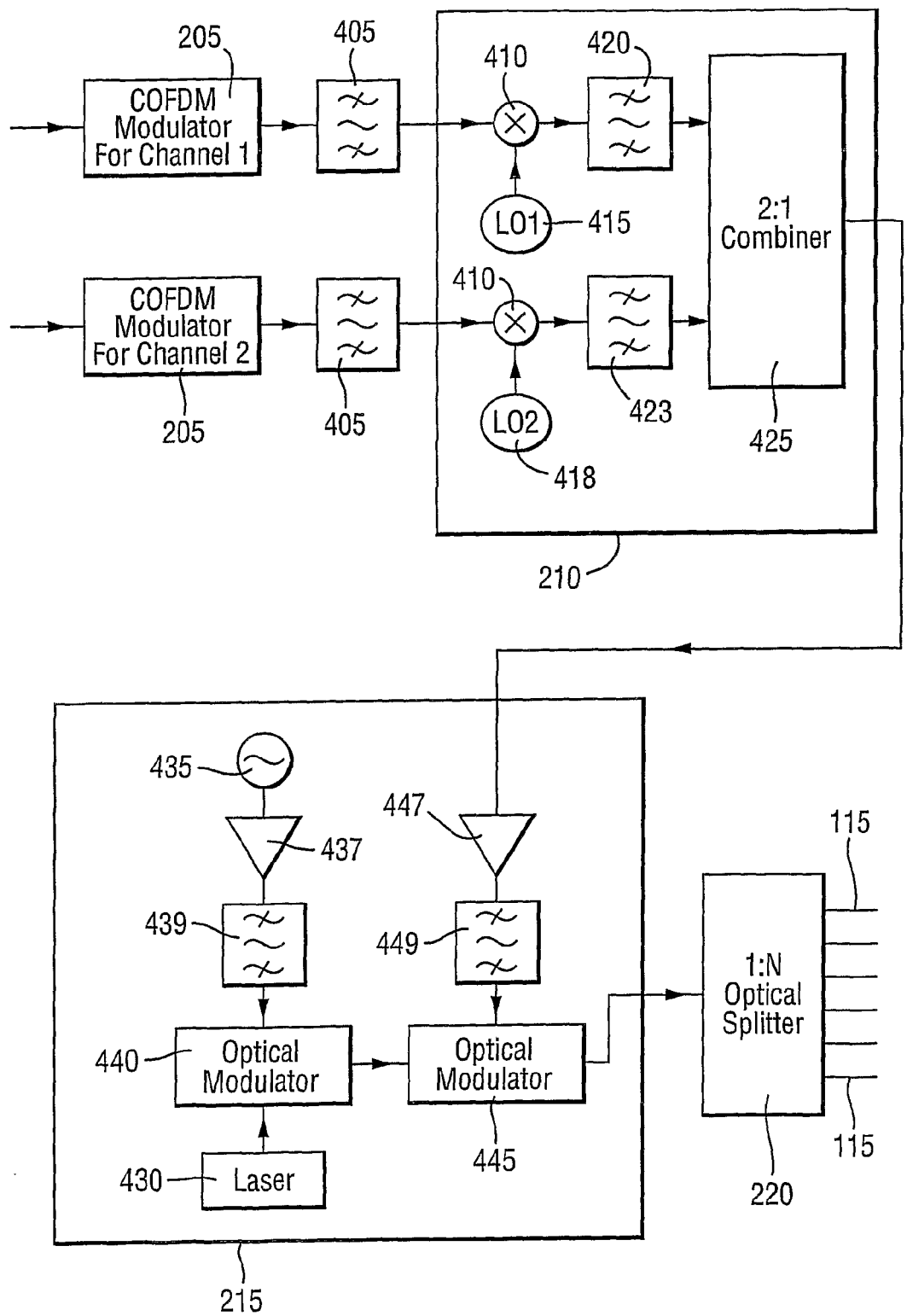
FIG. 4 shows the components of a downlink transmitting interface of a base station according to a preferred embodiment of the present invention.

Referring to FIG. 4, components of a preferred two channel downlink transmitting interface 200 are shown. In particular, two modems (modulators) 205 are provided, one for each data channel. To communicate with a particular one of the mobile data terminals 120, 125, an appropriate one of the two data channels is selected and data is input to the respective modem 205 for that channel. The modem 205 modulates the input data signal, preferably according to the COFDM modulation scheme. Though not shown in FIG. 4, preferably the "I" and "Q" channel outputs from a (COFDM) modem 205 are converted into a combined first intermediate frequency channel by mixing each of the "I" and "Q" signals with a 520 MHz intermediate frequency (IF) oscillator signal, the "Q" signal being mixed with a 520 MHz IF oscillator signal that is a quarter cycle out of phase with that for the "I" signal, and combining the resultant signals. The combined signal from each modem 205 is passed through a 520 MHz band-pass filter 405 having a bandwidth of approximately 340 MHz, to remove any unwanted harmonics and noise that would typically be generated as a result of the preferred IF mixing and combining stage.

The signal output from the filter 405 for each channel is then input to the downlink signal converter 210 for conversion into a signal of a predetermined frequency allocated for that data channel, preferably in the range 1.5 to 3.5 GHz. The downlink signal converter 210 comprises, for each data channel, a mixer 410 and a local oscillator (LO) 415, 418. The frequencies of the local oscillators 415, 418 are selected to ensure that when the oscillator signal is mixed (410) with the output signal from the filter 405, a signal of the predetermined frequency for that channel is generated. Preferably, the frequencies of the local oscillators 415, 418, and hence the predetermined frequencies for the channels, are selected so as to minimise unwanted mixing products generated as a result of mixing the signal from the local oscillators 415, 418 with the output signals from the filters 405, bearing in mind the particular combination of frequencies used to generate those output signals. In the present example, having two data channels, the local oscillator 415 for one of the channels is preferably set to a frequency of 1.43 GHz and the local oscillator 418 for the other channel is set to a frequency of 2.68 GHz. If the base station 100 were to be equipped to provide n data channels, then n modems 205, filters 405, mixers 410 and local oscillators 415, 418, would typically need to be provided, each local oscillator being set to a different frequency such as to generate a channel signal within a predetermined frequency range, e.g. 1.5-3.5 GHz. The process of selecting channel frequencies and hence corresponding oscillator frequencies takes place as part of an overall design stage for the apparatus. However, while the use of fixed local oscillator frequencies is discussed in the present example, a switching arrangement can be implemented to enable different local oscillators to be selected to enable switching between data channels and hence communication with different mobile terminal units 120, 125. Alternatively, tuneable local oscillators may be provided to achieve a similar effect.

The output from the mixer 410 comprises not only a signal at the allocated frequency for the data channel but also signals at one or more other frequencies. A filter 420, 423 is used therefore to remove the unwanted components from the mixer output signal leaving only a signal of the allocated frequency for the data channel. In the present example, the filters 420 and 423 are band-pass filters centred on frequencies of 1.95 GHz and 3.2 GHz respectively, both having a bandwidth greater than or equal to 340 MHz. The signals emerging from the filters 420 and 423, each of a distinct frequency, are combined in a combiner 425 to form a composite signal for input to the optical transmitter 215. The combiner 425 in the present example is a 2:1 combiner because there are only two data channels. If the base station 100 was equipped to provide n channels, then an n:1 combiner would be provided to combine the signals into a single composite channel.

In a preferred embodiment of the present invention, the optical transmitter 215 is constructed according to a cascaded optical modulator design. An optical carrier generated by a laser 430 is optically coupled using polarisation maintaining optical fibre to a first optical modulator 440 arranged to modulate the optical carrier with an amplified (437) and filtered (439) oscillator signal generated by an oscillator 435 to form an optical oscillator signal and, in a second optical modulator 445, optically coupled using polarisation maintaining optical fibre to the first optical modulator 440, the optical oscillator signal is modulated with an amplified (447) and filtered (449) composite signal output by the combiner 425. The frequency of the oscillator 435 is selected to ensure that a signal is output from the second optical modulator 445 having a predetermined frequency suitable for wireless transmission by the RAUs 110. This predetermined frequency would be required to fall within a range of frequencies for which a licence to transmit has been granted. In preferred embodiments of the present invention this range of frequencies is chosen to be 57-59 GHz for the downlink and 62-64 GHz for the uplink, with a local oscillator frequency of 60.5 GHz. The downlink optical signal output by the second optical modulator 445 is split by the optical splitter 220 and injected into each of the downlink optical fibres 115 linking the base station 100 with the RAUs 110.

Operation of the optical transmitter 215 will now be described in more detail according to a preferred embodiment of the present invention with reference to FIG. 5.

Figure 5:
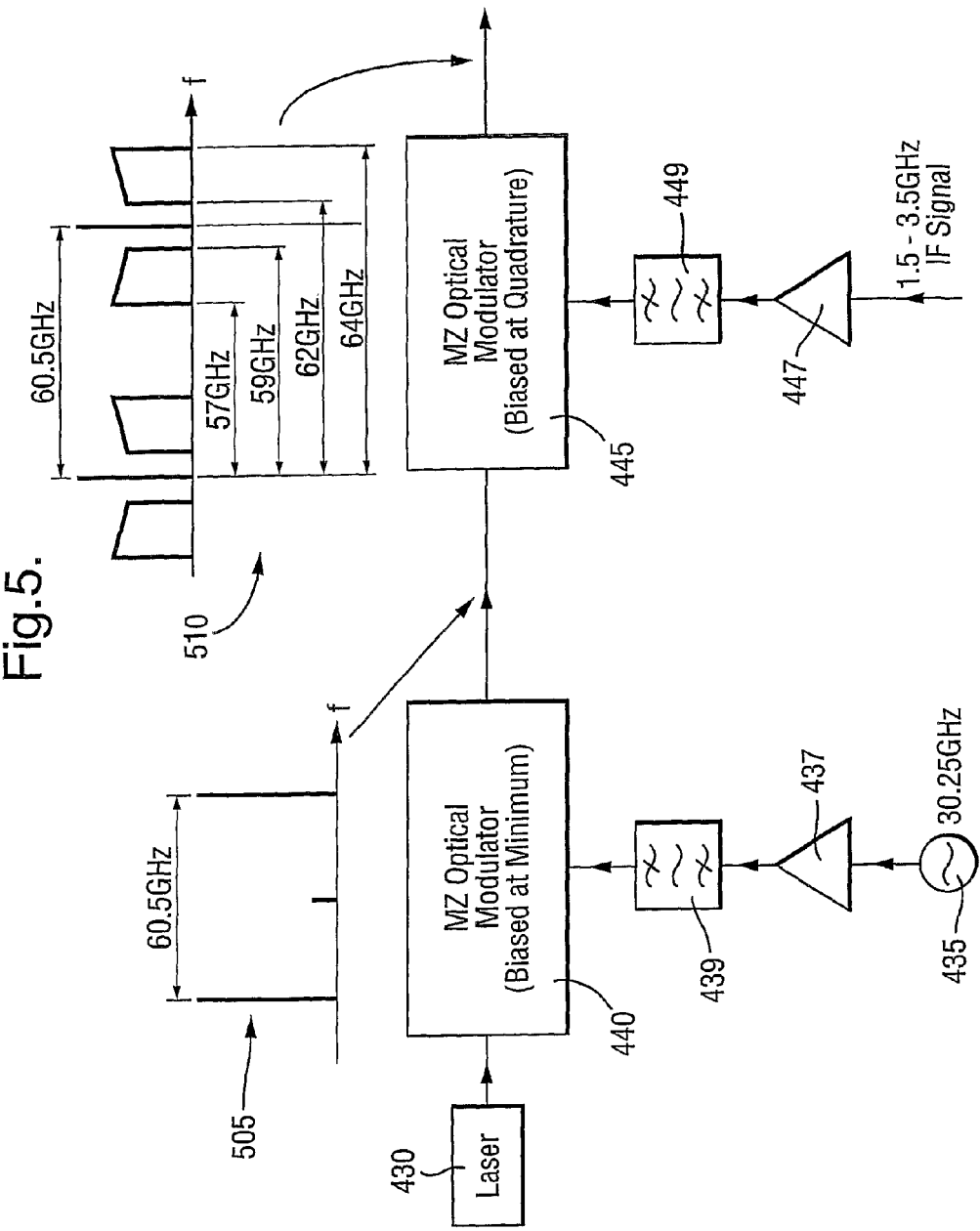
FIG. 5 shows the components of a downlink optical transmitter arranged to transmit both local oscillator and data signals according to a preferred embodiment of the present invention.

Referring to FIG. 5, the optical modulators 440 and 445 are preferably commercially available high frequency Mach-Zehnder (MZ) optical modulators. The first optical modulator 440 is biased at the minimum of its transfer characteristic so that a frequency-doubling effect can be achieved in modulating the laser light (430), preferably output by 50 mW DFB laser diode 430, with the amplified oscillator signal (435, 437, 439). Frequency doubling may be achieved by biasing the first optical modulator 440 at either its maximum or minimum. However, it is preferable to bias at the minimum point as this minimises the dc light level at a photo-receiver and thus provides the best noise performance. Making use of the frequency doubling properties of a MZ modulator enables an oscillator 435 having a frequency of only 30.25 GHz to be used to generate a 60.5 GHz oscillator signal in the optical output from the first MZ optical modulator 440—in fact two optical oscillator sideband signals are generated, as shown (505) in FIG. 5, separated by 60.5 GHz—the laser carrier itself (430) being suppressed. The second MZ optical modulator 445 is biased at the quadrature point, the most linear region of its transfer characteristic. When the amplified composite IF data signal is input to the second MZ optical modulator 445 each of the optical oscillator sidebands is modulated resulting in a pair of optical data signal sidebands centred about each of the optical oscillator sidebands, as shown (510) in FIG. 5, the first pair in the frequency range 57-59 GHz and the second in the range 62-64 GHz respectively in the present example, corresponding to the composite IF data signal frequency range of 1.5 to 3.5 GHz. Each data signal sideband is separated, in the frequency domain, from the optical oscillator sideband signals according to the frequencies of the signal components within the composite IF data signal. The downlink optical signal output by the second MZ optical modulator 445 is then injected into each of the downlink optical fibres 115 for sending to the RAUs 110.

Operation of an RAU 110 will now be described in more detail, according to a preferred embodiment of the present invention, with reference to FIG. 6.

Figure 6:
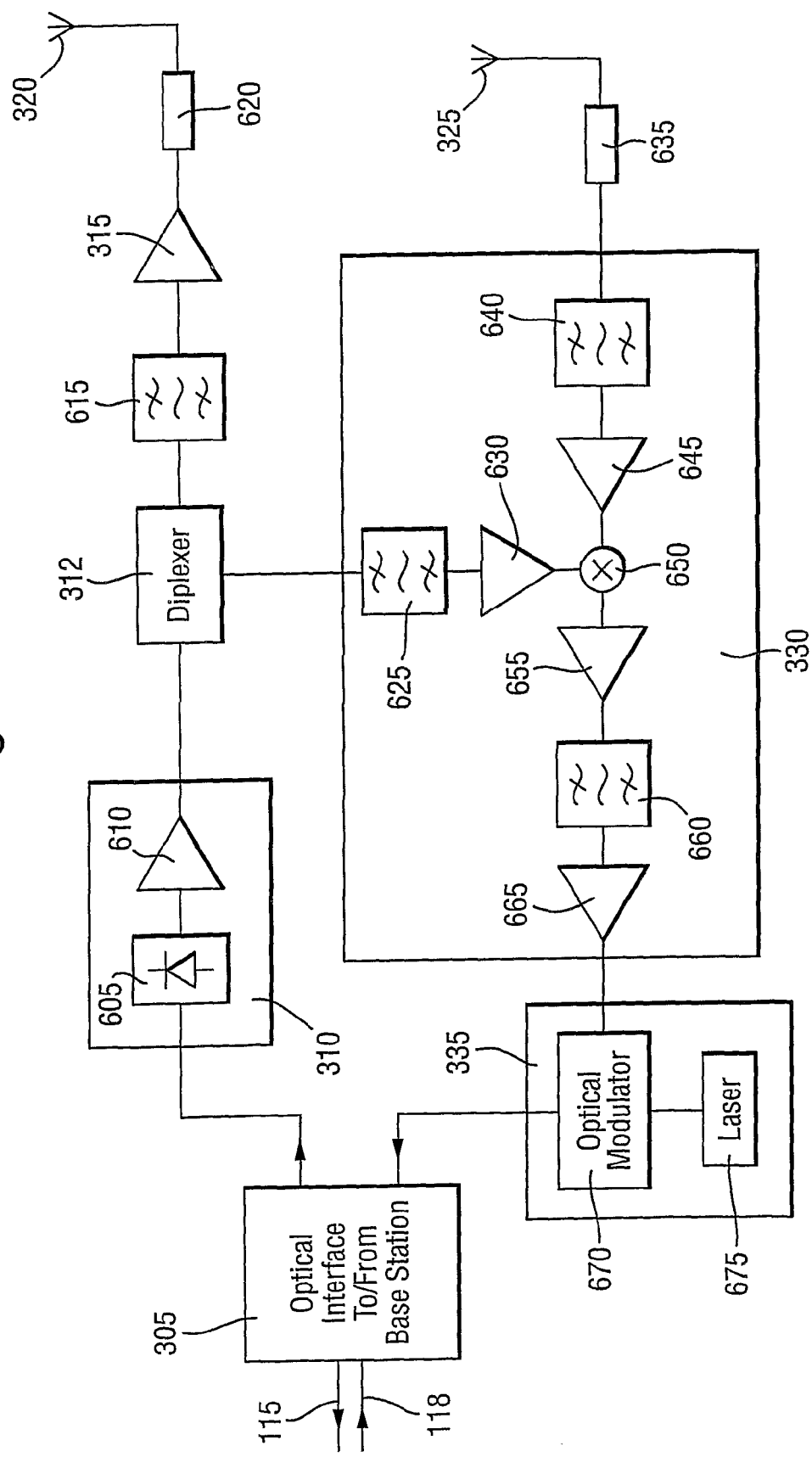
FIG. 6 shows the components of a remote antenna unit according to a preferred embodiment of the present invention.

Referring to FIG. 6, the downlink optical signal output by the optical transmitter 215 at the base station 100 is received over the downlink optical fibre 115 at an optical interface 305 and passed to an optical receiver 310 comprising a photo-receiver 605. The RF electrical outputs from the photo-receiver 605 are the 60.5 GHz local oscillator signal, as generated by the base station optical transmitter 215, and the lower and upper data signal sidebands in the frequency ranges 57-59 GHz and 62-64 GHz respectively (60.5 GHz±1.5-3.5 GHz). The RF signals are amplified in an amplifier 610 and input to a diplexer 312 arranged to separate the local oscillator signal from the data signal sidebands. Preferably, in the present example, the lower frequency sideband in the range 57-59 GHz is retained as the downlink signal for transmission by the RAU 110, while the upper frequency sideband is blocked by means of a band-pass filter 615 that permits only the lower frequency band to pass to the power amplifier 315 and then by means of an isolator 620 to the downlink antenna 320. The separated local oscillator signal is passed to the uplink signal converter 330 for use in converting received mm-wave uplink signals into IF uplink signals.

In the uplink direction a mm-wave signal transmitted by a mobile data terminal 120, 125 and received at the RAU 110 by the antenna 325 is passed by means of an isolator 635 to the uplink signal converter 330. The received uplink signal is first filtered in a band-pass filter 640 arranged to allow signals in the range 62-64 GHz to pass—the preferred frequency range for uplink communications in the present example—then amplified in an amplifier 645 and input to a mixer 650. The separated 60.5 GHz local oscillator signal from the diplexer 312 is filtered in a 60.5 GHz band-pass filter and amplified by an amplifier 630 before input to the mixer 650. The result of mixing the 60.5 GHz local oscillator signal with the received uplink signal is, amongst other mixing products, an uplink IF signal in the frequency range 1.5-3.5 GHz. The mixer output is amplified in an amplifier 655 before filtering out all but the uplink IF signal in the frequency range 1.5-3.5 GHz in a band-pass filter 660. After further amplification in an amplifier 665 the uplink signal converter 330 outputs the uplink IF signal to the uplink optical transmitter 335. The uplink optical transmitter 335 comprises an optical modulator 670 to modulate the uplink IF signal onto an optical carrier signal provided by a laser 675 to generate an uplink optical signal which is then injected into the uplink optical fibre 118 to the base station 100.

The uplink receiving interface 245 of the base station 100 will now be described in more detail according to a preferred embodiment of the present invention with reference to FIG. 7. The same reference numerals are used to label features shown in FIG. 7 that are similar to those in any of the earlier figures.

Figure 7:
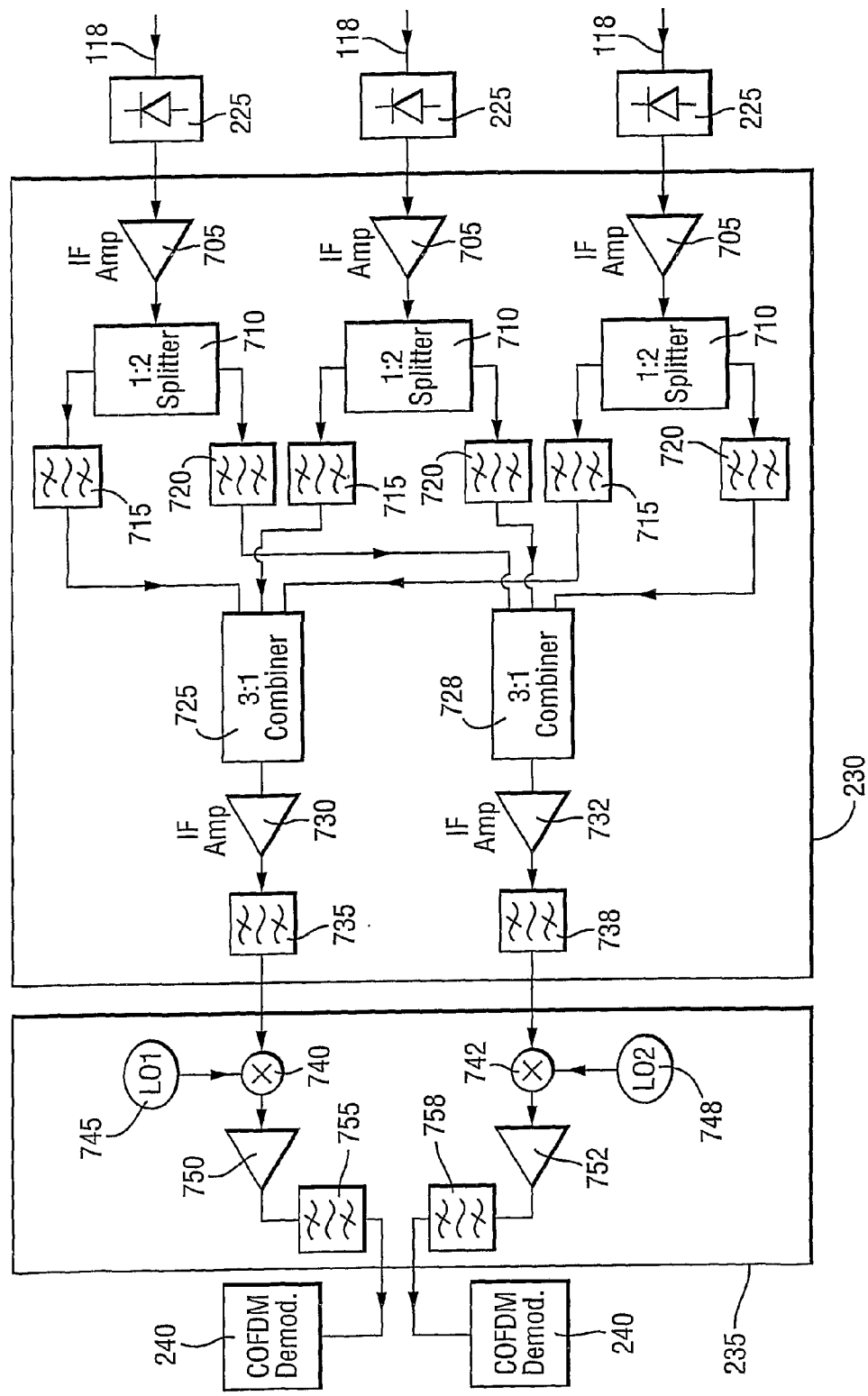
FIG. 7 shows the components of an uplink receiving interface according to a preferred embodiment of the present invention.

Referring to FIG. 7, components of a preferred two channel uplink receiving interface 245 are shown. The uplink receiving interface 245 in this example is arranged to interface with any combination of three RAUs 110, although of course the base station 100 may be scaled to interface with further RAUs 110 as will be clear from this description. Uplink optical signals received over any of the three uplink optical fibres 118 are detected by a photo-receiver 225 linked to that uplink optical fibre 118 by an appropriate interface. The photo-receiver 225 converts the received uplink optical signal into an uplink IF signal similar to that generated by the uplink signal converter 330 within the RAU 110. A different photo-receiver 225 is provided to receive signals from each of the three uplink optical fibres 118. The uplink IF signal output by each of the photo-receivers 225 is then input to the channel separator 230. Uplink optical signals received from an RAU 110 may carry signals for more than one data channel simultaneously if the RAU 110 was within range of multiple transmitting mobile terminal units 120, 125. The channel separator 230 is designed to separate the signals for each of the data channels and, where signals for a given data channel are separately received from more than one RAU 110, to combine all the received signals for a given data channel so as to output a combined channel signal for each channel. Thus, in the example shown in FIG. 7, the three uplink optical fibre inputs 118 convert to two channel outputs from the channel separator 230.

The signals for each data channel are distinguished by their differing frequencies. Hence, after amplification in an IF amplifier 705, the channel separator 230 splits the uplink IF signal from each photo-receiver 225 along two signal paths, one signal path per data channel, using a splitter 710. In the present example, one signal path leads to a 1.95 GHz band-pass filter 715 to pass signals at the allocated frequency for the first data channel and the other signal path leads to a 3.2 GHz band-pass filter 720 to pass signals at the allocated frequency for the second data channel. Signals passed by each of the three first band-pass filters 715 shown in FIG. 7 for the first data channel are combined in a 3:1 combiner 725 (if there were n RAUs 110, then the combiner 725 would be an n:1 combiner) and similarly for the three band pass filters 720 for the second data channel in a different 3:1 combiner 728. The combined uplink IF signals for each data channel are each then amplified in IF amplifiers 730 and 732, filtered again in further respective band-pass filters 735, 738, similar to filters 715 and 720 respectively, to remove any signal components generated by the combiner 725 at frequencies other than the desired channel frequencies. After filtering, the combined signals for each data channel are output, separately, to the uplink signal converter 235.

The uplink signal converter 235 comprises, for each data channel, a mixer 740, 742 and a local oscillator 745, 748. The local oscillators 745, 748 operate at the same frequencies as the local oscillators 415 and 418 respectively in the downlink transmitting interface 210 described above. The combined uplink IF signals for each channel are received at the respective mixer 740, 742 and mixed with the corresponding local oscillator signals. The resultant signals are then amplified by a respective IF amplifier 750, 752. The mixers 740, 742 generate a number of signal components of which only one is required. Therefore a band-pass filter 755, 758 is used to block the unwanted signal components for each channel before the required uplink signal components are output to be demodulated in respective COFDM demodulators 240.

Preferably, the modems 240 are COFDM modems. The demodulated data signal for each channel is then output from the modem 240, for example to the central terminal unit 105.

A preferred mobile transmit/receive interface will now be described, with reference to FIG. 8, for use in a mobile terminal unit 120, 125 to enable communication with the base station 100 via the RAUs 110. In a preferred application, the mobile transmit/receive interface may be physically mounted and electronically connected to a movable television camera to enable the camera to transmit image data to and receive control data from a central studio, for example, by means of the RAUs 110 and base station 100.

Figure 8:
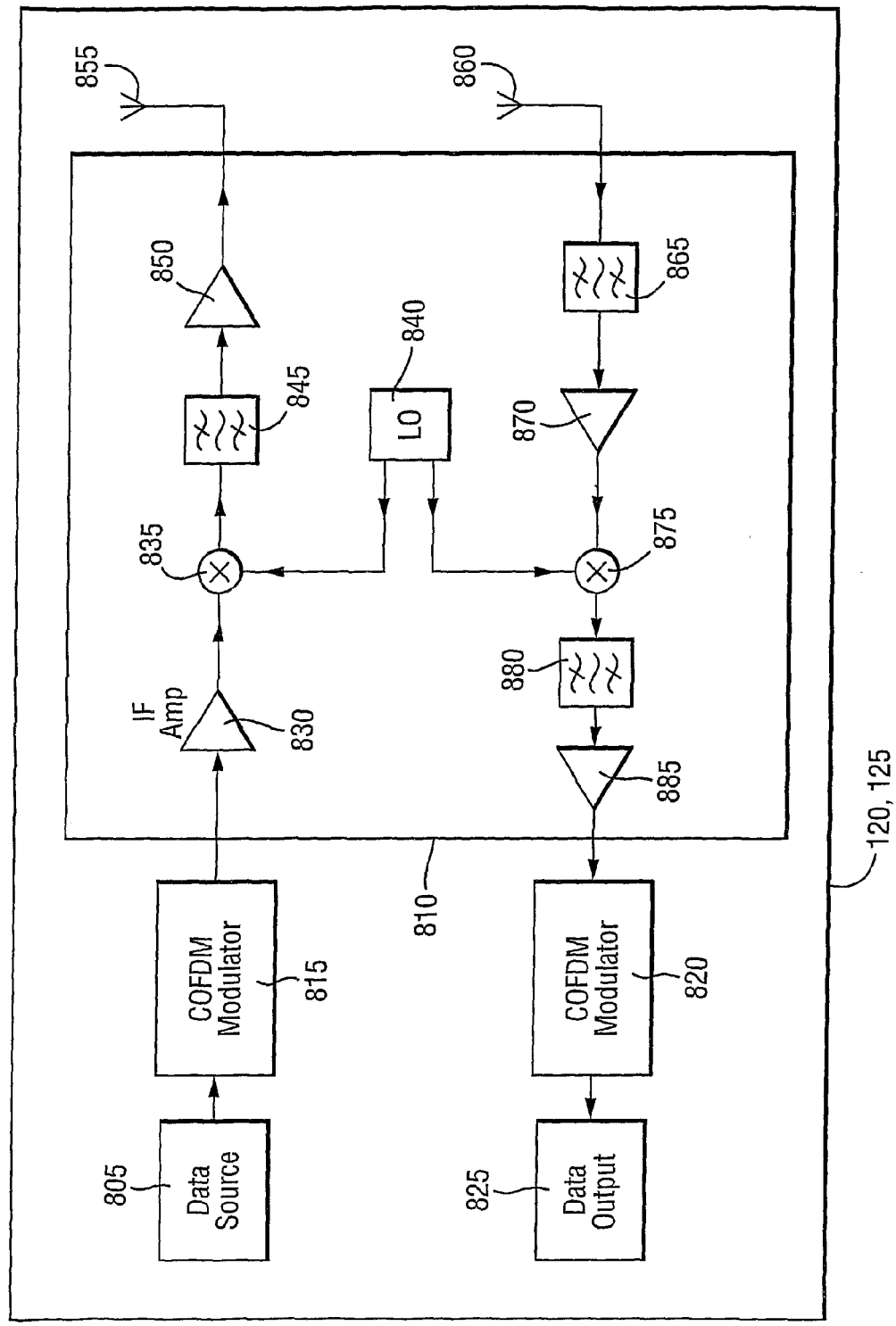
FIG. 8 shows the components of a mobile transmit/receive interface according to a preferred embodiment of the present invention.

Referring to FIG. 8, components in a preferred mobile terminal unit 120, 125 are shown, including a data source 805, a TV camera for example, linked for uplink communications to the mobile transmit/receive interface 810 by means of a COFDM modulator 815. A downlink signal output from the mobile transmit/receive interface 810 is demodulated in a COFDM demodulator 820 for output (825) to a TV monitor, for example. Both the COFDM modulator 815 and demodulator 820 are arranged to cooperate with the demodulators 240 and modulators 205 respectively, as used in the base station 100. Although not shown in FIG. 8, the COFDM modulator 815 includes circuitry to convert a baseband modulated signal into an IF uplink data signal of a predetermined frequency specific to that mobile transmit/receive interface 810, either 1.95 GHz or 3.2 GHz in the present two-channel example. Similarly, the COFDM demodulator 820 includes circuitry to convert a downlink IF data signal into a signal of the required frequency for demodulation by the COFDM demodulator 820. This assumes of course that the mobile transmit/receive interface is going to be used to communicate on only one of the data channels supported by the base station 100, although a switching arrangement can be provided at the mobile terminal unit 120, 125 if required to enable switching between channel frequencies in a similar manner to that mentioned above in describing the operation of a preferred base station 100.

Considering the uplink direction first, a signal input by the data source 805 is COFDM modulated and converted (815) into an IF uplink data signal. The mobile transmit/receive interface 810 receives the uplink IF data signal and amplifies it in an IF amplifier 830 and mixes the amplified signal in a mixer 835 with a 60.5 GHz local oscillator signal, in the present example, generated by a local oscillator 840. The mixer output is then filtered in a band-pass filter to block all but those mixer products in the preferred uplink wireless communication frequency range of 62-64 GHz. After amplification in a power amplifier 850, the uplink data signal is transmitted wirelessly by means of an antenna 855 to be received by one or more RAUs 110.

In the downlink direction, a signal transmitted by one or more RAUs 110, in the preferred downlink wireless communication frequency range of 57-59 GHz for the present example, is received at an antenna 860. The received downlink signal is filtered in a 57-59 GHz band-pass filter 865 and amplified in a low-noise amplifier (LNA) 870 before input to a mixer 875 arranged to mix the amplified signal with the local oscillator signal from oscillator 840. One of the results of mixing the oscillator signal with a signal in the range 57-59 GHz is a downlink IF data signal in the frequency range 1.5-3.5 GHz. All other mixer products are blocked in a band-pass filter 880, leaving the downlink IF data signal to be amplified in an IF amplifier 885 for output from the mobile transmit/receive interface 810. The output IF data signal is converted and demodulated in the COFDM demodulator 820 and output (825), for example to a TV monitor.

An alternative design for the downlink optical transmitter and local oscillator 215 will now be described, according to a preferred embodiment of the present invention, with reference to FIG. 9. Those components shared in common with the transmitter 215 described above with reference to FIG. 4 and FIG. 5 are labelled with the same reference numerals.

Figure 9:
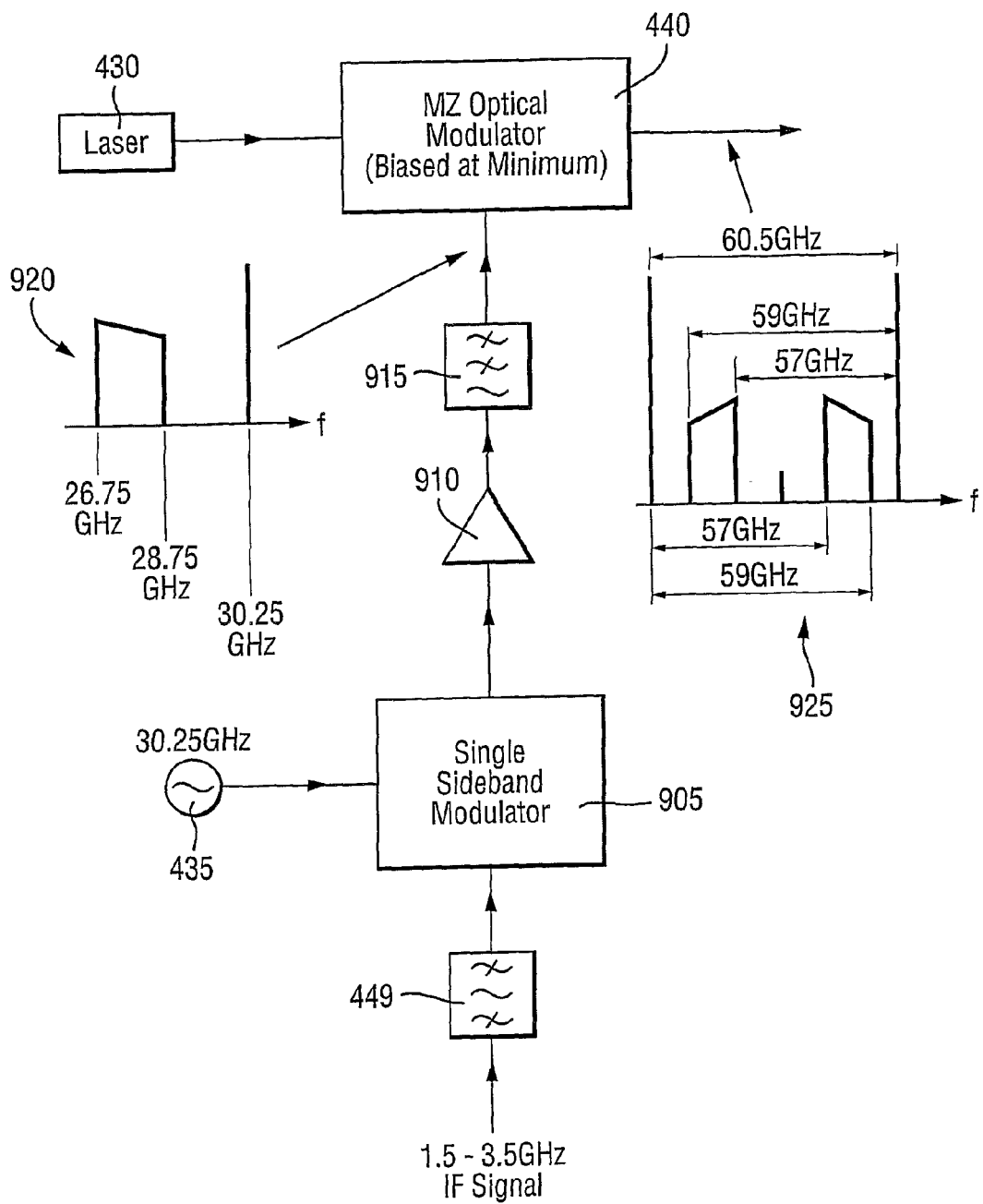
FIG. 9 shows the components of a further design for the downlink optical transmitter according to a preferred embodiment of the present invention.

Referring to FIG. 9, a preferred optical transmitter is shown constructed according to a so-called RF single sideband frequency-doubled design. In this design the composite signal output by the combiner 425 is firstly filtered in a 1.5-3.5 GHz band-pass filter 449 before input to a single-sideband non-suppressed carrier electrical modulator 905 to modulate an RF oscillator signal generated by the oscillator 435. It is important that the oscillator carrier signal is not suppressed by the modulator as the oscillator signal will be included in the signal transmitted to the RAUs 110. The resulting single-sideband signal and the oscillator signal output by the modulator 905 are further amplified (910) and filtered in a 30.5 GHz low-pass filter 915 to provide additional rejection of any unwanted upper sideband signal. The resultant single-sideband signal and oscillator signal, shown (920) in FIG. 9, are input to a MZ optical modulator 440 biased at the minimum of its transfer characteristic, as for the first optical modulator in the cascaded optical modulator design described above with reference to FIG. 5, so as to achieve frequency doubling and suppression of the optical carrier input from a laser 430. The laser 430 is optically coupled using polarisation maintaining optical fibre to the MZ optical modulator 440 where the optical carrier is modulated by the single-sideband and oscillator signal (920). The result (shown as 925 in FIG. 9) is a downlink optical signal comprising a pair of local oscillator signals separated by 60.5 GHz together with two downlink data sidebands separated, in the frequency domain, from the oscillator signal according to the frequency of the single-sideband signal (920). Although the frequencies of the single-sideband and oscillator signals input to the MZ modulator 440 are doubled, the frequency separation of the oscillator and sideband signal components is maintained after modulation—an important feature that enables this design of optical transmitter 215 to be used as an alternative to the cascaded optical transmitter design described above with reference to FIG. 5 without needing to modify the design of the other components of the apparatus or the mobile terminal units 120, 125. The downlink optical signal output by the MZ optical modulator 440 is shown as 925 in FIG. 5. This signal is injected into the downlink optical fibres 115 for communication to the RAUs 110.

A preferred application of the apparatus described above according to preferred embodiments of the present invention will now be described in outline. This preferred application was alluded to above and concerns the wireless communication of signals from television or film cameras in a TV studio or film set environment. In such an environment, particularly one comprising a number of distinct studios, signals transmitted wirelessly by RAUs 110 at a frequency of approximately 60 GHz, as discussed throughout the example presented in the description above, would be essentially constrained to particular studios. Even in free space, such signals are subject to attenuation at the rate of 12 dB/km. Thus, the possibility of multipath signals can be significantly reduced, particularly where shaped radiation pattern antennae are used in both the RAUs 110 and the mobile transmit/receive interfaces 810 to reduce reflections from studio walls, etc.

Preferred designs for shaped radiation pattern antennae will now be described according to preferred embodiments of the present invention. Firstly, a preferred design for use as an antenna unit 320, 325 for an RAU 110 will be described with reference to FIG. 10 and secondly a preferred design for use as an antenna 855, 860 for a mobile terminal unit 120, 125 will be described with reference to FIG. 11. Preferably, each of the antennae are designed for use with signals in the frequency range 57 to 64 GHz, although it would be apparent to a person of ordinary skill in the field of antenna design that the antennae may be designed to operate in other frequency ranges according to the particular application of the apparatus of the present invention.

Figure 10A:
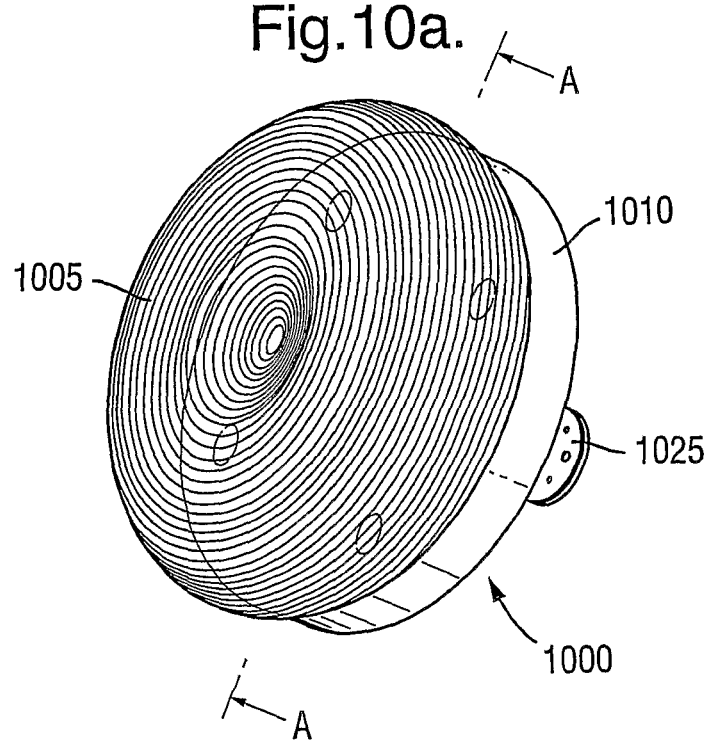
FIG. 10 shows a shaped-dielectric antenna suitable for use with a remote antenna unit according to a preferred embodiment of the present invention.

Referring to FIG. 10a, a plan view of a preferred shaped radiation pattern antenna 1000 is shown. The preferred antenna 1000 is a rotationally symmetric shaped-dielectric lens antenna comprising a dielectric lens portion 1005, preferably made from PTFE, mounted on a conducting mounting plate 1010. The dielectric lens 1005 is of a known shape designed to produce a substantially $\sec^2\theta$ radiation power pattern, where $\theta$ is the angle measured from the axis of symmetry through the antenna 1000, for angles of $\theta$ up to approximately 70°. This power pattern has been found to be suitable for use in an enclosed environment such as a television studio where the antenna is attached to the ceiling near to the centre of the space. This design forms a good compromise for use in such environments over an alternative known, but more complex, lens design capable of producing substantially rectangular radiation fields.

Figure 10B:
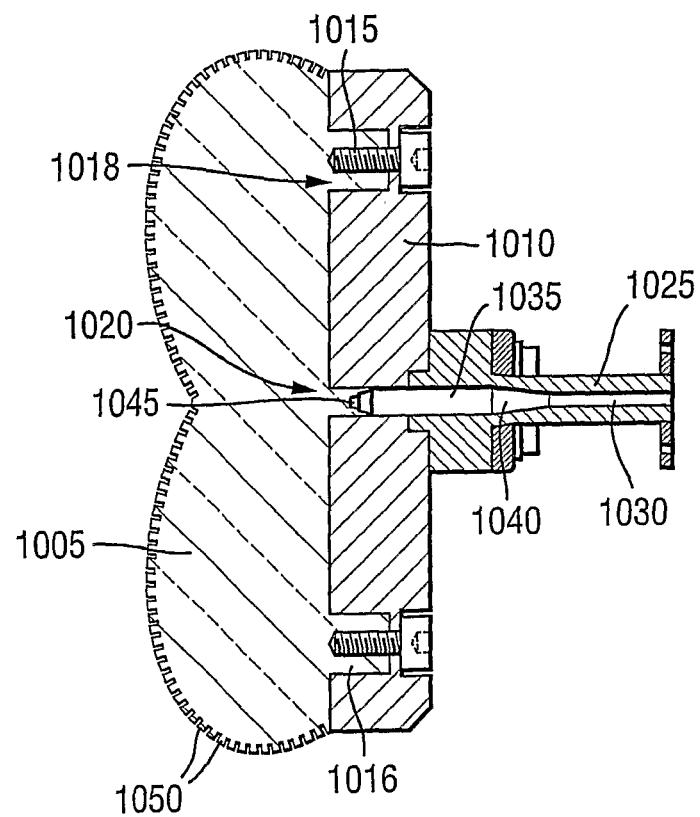

Referring to FIG. 10b, a plane section through the antenna 1000 is shown, taken through the plane indicated by the line A-A in FIG. 10a. The shaped dielectric lens 1005 is attached to the conducting mounting plate 1010 by means of four fixing bolts 1015, each made, optionally, from a similar material to that used for the dielectric lens 1005 itself, although metal bolts may also be used. Each bolt 1015 engages with a corresponding threaded hole provided in a projecting annular portion 1016 of the dielectric lens 1005 which itself engages with a corresponding annular recess 1018 provided in the mounting plate 1010. A hole 1020 is provided through the centre of the mounting plate 1010 to provide a point of entry for a waveguide 1025 assembly. The waveguide assembly 1025 comprises an air-filled polariser, of conventional design, arranged in two parts to emit radiation with circular polarisation into the dielectric lens: a rectangular-sectioned portion 1030 leading to a flattened circular sectioned portion 1035, with appropriately shaped transition sections 1040 and 1045 disposed between the rectangular 1030 and flattened circular 1035 air-filled sections and between the air-filled flattened circular 1035 and dielectric-filled entry hole 1020, respectively. That portion of the hole 1020 not occupied by the waveguide feeder transition section 1045 is filled with dielectric material, preferably the same material as that used for the lens 1005 itself. Preferably, a portion of the dielectric material may have a central bore or alternatively have its external radius reduced in order to provide an impedance matching section between the air-filled circular waveguide and dielectric-filled entry hole.

Preferably, an axially-symmetric pattern of circular grooves 1050 is cut into the surface of the dielectric lens to help to reduce the effects of internal reflections within the lens, in a known manner.

Figure 11A:
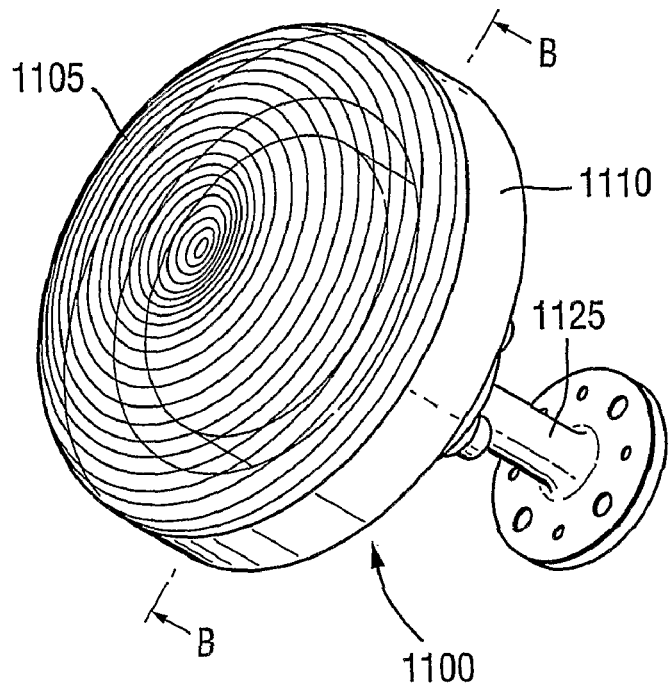
FIG. 11 shows a shaped-dielectric antenna suitable for use with a mobile terminal unit according to a preferred embodiment of the present invention.

Referring to FIG. 11a, a plan view of a preferred shaped radiation pattern antenna 1100 is shown for use with a mobile terminal unit 120, 125. The preferred antenna 1100 is a rotationally symmetric shaped-dielectric lens antenna comprising a dielectric lens portion 1105, also preferably made from PTFE, mounted on a conducting mounting plate 1110. The dielectric lens 1105 is shaped according to a known shape designed to produce a substantially hemispherical radiation power pattern.

Figure 11B:
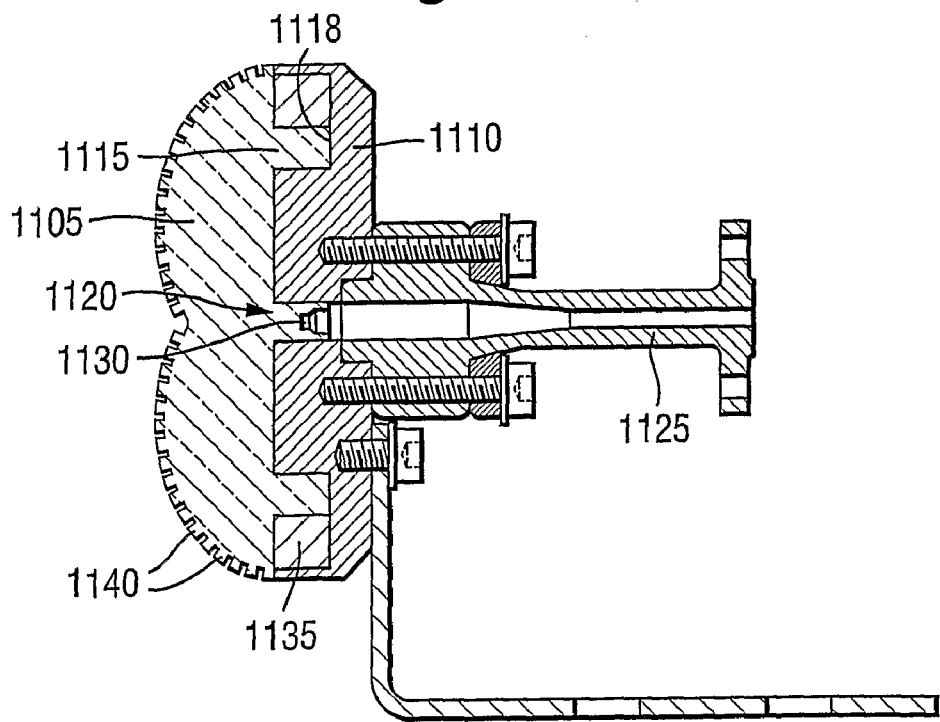

Referring to FIG. 11b, a plane section through the antenna 1100 is shown, taken through the plane indicated by the line B-B in FIG. 11a. The shaped dielectric lens 1105 is attached to the conducting mounting plate 1110 by means of a projecting annular portion 1115 which engages with a corresponding annular recess 1118 provided in the mounting plate 1110. A hole 1120 is provided through the centre of the mounting plate 1110 as a point of entry for a waveguide 1125 assembly. The waveguide assembly 1125 is similar in design to that (1025) used with the RAU antenna 1000 of FIG. 10, although with a smaller diameter feed 1130 into the dielectric lens 1105 to give a wider radiation pattern and hence a wider illumination of the lens 1105. However, in providing a wider illumination within the lens 1105 the effect of internal reflections on the radiation pattern has been found to be greater than that with the RAU antenna 1000, in particular on the radiation pattern towards the outer limits of the field between 70° and 90° as measured from the axis of symmetry of the lens. It is has been found, however, that if an annular portion 1135 of a radiation absorbing material, for example Emerson & Cuming "Eccosorb AN-72"™, is disposed in an annular recess formed towards the outer edge of the mounting plate 1110, a recess formed preferably by extending the width of the recess 1118 radially outwards, then the effect of the internal reflections can be considerably reduced. Preferably, the projecting annular portion 1115 of dielectric material together with the annular portion of absorber material 1135 together fill the extended annular recess 1118 in the mounting plate 1110 to provide a secure attachment of the dielectric lens 1105 to the mount 1110.

As with the RAU antenna 1000, the surface of the dielectric lens 1105 of the mobile terminal unit antenna 1100 is provided with a pattern of circular grooves 1140 to reduce internal reflections.

Whereas, in some applications, a single mobile terminal unit 120, 125 may require the entire bandwidth of a data channel, in other applications a number of mobile terminal units may share a given data channel and the associated base station equipment by using a combination of Time Division Multiplexing (TDM) and Frequency Division Multiplexing (FDM). This would involve allocating time intervals to a group of mobile users who all operate at one frequency. There would be a number of these 'groups' operating at different frequencies. However, whereas a conventional cellular radio system is designed to support low bandwidth communication by millions of mobile users, the apparatus according to preferred embodiments of the present invention is intended for user numbers of the order of hundreds.

The invention claimed is:

1. A base station, operable to communicate data over a two-way communications channel established with a mobile terminal unit, by way of a plurality of antenna units operable to communicate wirelessly with the mobile terminal unit, wherein the base station is operable to communicate with said a plurality of antenna units over optical fibre links, the base station comprising:
   an optical transmitter for generating and transmitting downlink optical data signals to said antenna units; and
   an optical receiver for receiving uplink optical data signals generated by said antenna units in respect of said communications channel, wherein said optical transmitter comprises:
   a light source operable to generate an optical carrier;
   a first optical modulator operable to modulate said optical carrier with a radio frequency oscillator signal to generate an optical oscillator signal suitable for use by said at least one antenna unit in generating uplink optical data signals; and
   a second optical modulator, coupled optically to the first optical modulator, operable to receive the optical oscillator signal and to modulate the optical oscillator signal with an input data signal of a frequency allocated in respect of said communication channel and generate and to output a downlink optical data signal comprising the modulated optical oscillator signals,
   wherein the second optical modulator is directly coupled to the first optical modulator, and comprises an optical splitter for distributing the downlink optical data signal from the second optical modulator to the plurality of antenna units.

2. The base station according to claim 1, wherein each of said first and second optical modulators are Mach-Zehnder optical modulators.

3. The base station according to claim 2, wherein said first Mach-Zehnder optical modulator is biased at the minimum of its transfer characteristic so that the optical oscillator signal includes an oscillator signal having twice the frequency of the radio frequency oscillator signal used to modulate the optical carrier.

4. The base station according to claim 2, wherein the second Mach-Zehnder optical modulator is biased at the quadrature point of its transfer characteristic.

5. The base station according to claim 1, wherein said optical receiver comprises photoreceiving means for detecting uplink optical data signals received over said optical fibre link from said at least one antenna unit and for separating signals in respect of said communications channel from those of other channels.

6. An antenna unit for use with a base station as defined in claim 1, comprising:
   a photodetector for converting a received downlink optical data signal into a radio frequency signal; and
   means to separate said radio frequency signal into a data signal for wireless transmission by the antenna unit and a local oscillator signal for use within the antenna unit to generate uplink optical data signals.

7. The antenna unit according to claim 6, further comprising:
   a receiver for receiving a radio frequency data signal transmitted by a mobile terminal unit;

a converter for converting the received radio frequency data signal, using the local oscillator signal, into an intermediate frequency data signal; and an optical transmitter for generating an uplink optical data signal to convey the intermediate frequency data signal to the base station.

8. A mobile terminal unit for use in communicating with a base station as defined in claim 1, the mobile terminal unit comprising:

a modulator operable to modulate an input data signal;

signal conversion means to convert the modulated input data signal into an uplink data signal having a frequency within a predetermined frequency range allocated in respect of a communications channel; and a transmitter operable to transmit wirelessly the uplink data signal for reception by at least one antenna unit linked to the base station.

9. The mobile terminal unit according to claim 8, wherein the signal conversion means comprise:

a local oscillator operable at a frequency corresponding to that of an oscillator signal output by the base station in a downlink optical data signal; and a mixer operable to mix an oscillator signal output by the local oscillator with the modulated data signal output by the modulator to generate the uplink data signal.

10. The base station according to claim 1, wherein the base station is arranged to use a Coded Orthogonal Frequency Division Multiplexing (COFDM) modulation scheme.

11. A method of communicating data over a two-way communications channel established between a base station and a mobile terminal unit, by way of a plurality of antenna units that are linked to said base station by means of an optical fibre link and are operable to communicate wirelessly with said mobile terminal unit, the method comprising the steps of:

(i) at a first optical modulator within said base station, modulating an optical carrier with the output from a radio frequency oscillator to generate an optical oscillator signal suitable for use by said antenna units to generate uplink optical data signals;

(ii) at a second optical modulator within said base station, linked optically to the first optical modulator, modulating the optical oscillator signal with an input modulated data signal of a frequency allocated in respect of said communications channel to generate a downlink optical data signal;

(iii) conveying the downlink optical data signal by means of said optical fibre links to said antenna units;

(iv) at said antenna units, converting the downlink optical data signal into a radio frequency data signal for wireless transmission and a local oscillator signal for use within the antenna unit to generate uplink optical data signals;

(v) receiving, at said antenna units, a modulated data signal transmitted by said mobile terminal unit over said communications channel and, using the local oscillator signal from step (iv), converting the received modulated data signal into an uplink optical data signal; and (vi) transmitting the uplink optical data signal to said base station over said optical fibre links, and (vii) supplying the optical oscillator signal from step (i) directly to the second optical modulator, splitting the downlink optical data signal from step (ii) into a plurality of signals, and conveying each split signal to a respective antenna unit in step (iii).

12. The method according to claim 11, further comprising the steps of:

(v) receiving, at said antenna units, a modulated data signal transmitted by said mobile terminal unit over said communications channel and, using the local oscillator signal from step (iv), converting the received modulated data signal into an intermediate frequency data signal; and (vi) transmitting the intermediate frequency data signal as an uplink optical data signal to said base station over said optical fibre links.

13. The method according to claim 11, wherein a Coded Orthogonal Frequency Division Multiplexing (COFDM) modulation scheme is used.

14. A communications system, comprising a base station and a plurality of antenna units linked to the base station by optical fibre links, wherein the system is operable to communicate data over a two-way communications channel established with a mobile terminal unit, and wherein said antenna units are operable to communicate wirelessly with the mobile terminal unit, the base station comprising:

an optical transmitter for generating and transmitting downlink optical data signals to said antenna units; and an optical receiver for receiving uplink optical data signals generated by said antenna units in respect of said communications channel, wherein said optical transmitter comprises:

a light source operable to generate an optical carrier;

a first optical modulator operable to modulate said optical carrier with a radio frequency oscillator signal to generate an optical oscillator signal suitable for use by said antenna units in generating uplink optical data signals; and a second optical modulator, coupled optically to the first optical modulator, operable to receive the optical oscillator signal and to modulate the optical oscillator signal with an input data signal of a frequency allocated with respect to said communications channel to generate and to output a downlink optical data signal comprising the modulated optical oscillator signal, wherein the second optical modulator is directly coupled to the first optical modulator, and the base station comprises an optical splitter for distributing the downlink optical data signal from the second optical modulator to the plurality of antenna units.

15. The communication system according to claim 14 wherein each antenna unit comprises:

a photodetector for converting the received downlink optical data signal into a radio frequency signal; and means to separate said radio frequency signal into a data signal for wireless transmission by the antenna unit and a local oscillator signal for use within the antenna unit to generate uplink optical data signals.

16. The system according to claim 14, wherein the system is arranged to use a Coded Orthogonal Frequency Division Multiplexing (COFDM) modulation scheme.

17. A communications system, comprising a base station and a plurality of antenna units linked to the base station by optical fibre links, wherein the system is operable to communicate data over a two-way communications channel established with a mobile terminal unit, and wherein said antenna units are operable to communicate wirelessly with the mobile terminal unit, the base station comprising:

an optical transmitter for generating and transmitting downlink optical data signals to said antenna units; and an optical receiver for receiving uplink optical data signals generated by said antenna units in respect of said communications channel, wherein said optical transmitter comprises:
  a light source operable to generate an optical carrier;
  a first modulator arranged to modulate a radio frequency oscillator signal with an input modulated data signal of a frequency allocated in respect of said communications channel to generate a modulated output signal comprising an oscillator signal and a modulated data signal; and
  a second, optical, modulator arranged to modulate said optical carrier with the modulated signal output by the first modulator to generate and output a downlink optical signal comprising an optical oscillator signal, suitable for use by said plurality of antenna units in generating uplink optical data signals, and a downlink optical data signal,
and wherein each antenna unit comprises:
  a photodetector for converting the received downlink optical data signal into a radio frequency signal; and
  means to separate said radio frequency signal into a data signal for wireless transmission by the antenna unit and a local oscillator signal for use within the antenna unit to generate uplink optical data signals, wherein the second optical modulator is directly coupled to the first optical modulator, and the base station comprises an optical splitter for distributing the downlink optical data signal from the second optical modulator to the plurality of antenna units.

18. The system according to claim 17, wherein said first modulator is a single sideband electrical modulator arranged to include the radio frequency oscillator signal in the modulated output signal.

19. The base station according to claim 17, wherein said second, optical, modulator is a Mach-Zehnder optical modulator biased at the minimum of its transfer characteristic so that the downlink optical signal includes an optical oscillator signal having twice the frequency of the radio frequency oscillator signal modulated by said first modulator.

20. The system according to claim 17, wherein the system is arranged to use a Coded Orthogonal Frequency Division Multiplexing (COFDM) modulation scheme.

* * * * *